(12) United States Patent
Zhou et al.

(10) Patent No.: US 12,107,633 B2
(45) Date of Patent: Oct. 1, 2024

(54) TWO-DIMENSIONAL OPTICAL MODULATION AND DETECTION TECHNOLOGIES FOR OPTICAL COMMUNICATIONS

(71) Applicant: Google LLC, Mountain View, CA (US)

(72) Inventors: Xiang Zhou, Sunnyvale, CA (US);
Cedric F. Lam, San Jose, CA (US);
Hong Liu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 134 days.

(21) Appl. No.: 17/875,025

(22) Filed: Jul. 27, 2022

(65) Prior Publication Data

US 2024/0039636 A1  Feb. 1, 2024

(51) Int. Cl.
*H04B 10/556* (2013.01)
*H04B 10/50* (2013.01)
*H04B 10/80* (2013.01)

(52) U.S. Cl.
CPC ..... *H04B 10/5561* (2013.01); *H04B 10/5053* (2013.01); *H04B 10/801* (2013.01)

(58) Field of Classification Search
CPC ............ H04B 10/5561; H04B 10/5053; H04B 10/801
USPC ........................................................ 398/188
See application file for complete search history.

(56) References Cited

U.S. PATENT DOCUMENTS

| | | | |
|---|---|---|---|
| 7,876,491 B2 | 1/2011 | Ide et al. | |
| 8,155,534 B2 | 4/2012 | Winzer | |
| 11,804,905 B1 * | 10/2023 | Zhang | H04B 10/504 |
| 2011/0274436 A1 | 11/2011 | Mcnicol et al. | |
| 2014/0153075 A1 | 6/2014 | Malacarne et al. | |
| 2016/0127046 A1 | 5/2016 | Zhang et al. | |
| 2017/0041020 A1 * | 2/2017 | Lee | H04L 27/345 |
| 2018/0269983 A1 * | 9/2018 | Karar | H04J 14/06 |
| 2020/0336211 A1 * | 10/2020 | Zhang | H01S 5/3224 |

FOREIGN PATENT DOCUMENTS

WO  WO-2024079894 A1 *  4/2024

OTHER PUBLICATIONS

Santiago et al; Multi-Dimensional Detection in Future Hyper-Scale Datacenters ; 2017; The Twelfth International Conference on Systems and Networks Communications; pp. 1-6. (Year: 2017).*

(Continued)

*Primary Examiner* — Amritbir K Sandhu
(74) *Attorney, Agent, or Firm* — Lerner David LLP

(57) ABSTRACT

Systems and methods are disclosed for two-dimensional optical transmission, including systems and methods for modulating and detecting two-dimensional short-reach optical communications. Two-dimensional optical transmissions may be generated by mapping a first data set to a first dimension of an optical signal and mapping a second data set to a second dimension of an optical signal. The encoded data for the first data set may be combined with the encoded data for the second data set so as to produce drive signals for a dual-drive modulator using a combination of both a common-mode and differential signal. The disclosed systems and methods also include dual-mode optical receivers that are configured to operate in either a one-dimensional or two-dimensional mode.

20 Claims, 12 Drawing Sheets

(56) References Cited

OTHER PUBLICATIONS

Bae et al; Cost-Effective 2-Channel OTDM System Implemented With Sinusoidally Modulated Light Source ; Sep. 2020; IEEE Access; pp. 1-6. (Year: 2020).*
Extended European Search Report for European Patent Application No. 23170756.3 dated Nov. 27, 2023. 8 pages.

* cited by examiner

TWO-DIMENSIONAL OPTICAL MODULATION AND DETECTION TECHNOLOGIES FOR OPTICAL COMMUNICATIONS

BACKGROUND

High performance computing within datacenters and other computing networks requires data to be transferred at an increasingly high bandwidth. Optical interconnects can be used within datacenters and other computing networks to transmit data within the network. The bandwidth of these optical interconnects can be a limiting factor with regard to the overall efficiency of the network. For example, many optical interconnects operate using a one-dimensional optical signal format, while other optical interconnects require transmitters with a large number of components. In addition, optical receivers are not designed to be efficient two-dimensional receivers that are also backwards compatible for use with one-dimensional transmissions. What is desired is a more bandwidth-efficient optical interconnect that is not prohibitive with respect to component costs and power consumption.

BRIEF SUMMARY

The disclosure relates generally to bandwidth-efficient optical modulation technologies in connection with transmitting and receiving optical signals. Systems and methods are disclosed that may be used in connection with network optical interconnects, including short-reach optical communications. In particular, systems and methods for two-dimensional optical transmission are disclosed based on various modulation and decoding techniques.

In accordance with one aspect of the disclosure, a method for two-dimensional optical signal transmission may comprise mapping a first data set to correspond with a first dimension of an optical signal as first encoded data and a second data set to correspond with a second dimension of the optical signal as second encoded data, generating a first drive signal and a second drive signal, wherein the first drive signal may represent a combination of the first encoded data and the second encoded data and the second drive signal may represent a combination of the first encoded data and a differential of the second encoded data. The method may also include providing an optical input to a dual-drive modulator having a first phase modulator and a second phase modulator, and driving the first phase modulator with the first drive signal and the second phase modulator with the second drive signal. The method may also include combining the output of the first phase modulator and second phase modulator to generate a two-dimensional modulated optical output.

In other aspects, the first dimension may be a phase of the optical signal and the second dimension may be an amplitude of the optical signal. Alternatively, the first dimension may be a phase variation of the optical signal and the second dimension may be a light intensity of the optical signal.

In another aspect, generating the first drive signal and the second drive signal may further comprise transmitting the first encoded data to a first digital-to-analog converter (DAC) and transmitting the second encoded data to a second DAC, and wherein output of the first DAC and output of the second DAC may be combined to generate the first drive signal and the second drive signal. In addition, the output of the first DAC may comprise a first voltage $V_1(t)$ and wherein the output of the second DAC comprises a second voltage $V_2(t)$, and wherein the first drive signal corresponds to a first combined voltage of $V_1(t)+V_2(t)$ and the second drive signal corresponds to second combined voltage of $V_1(t)-V_2(t)$.

In yet another aspect, generating the first drive signal and the second drive signal may further comprise digitally combining the first encoded data with the second encoded data so as to create an input for a first DAC, and digitally combining the first encoded data with a differential of the second encoded data so as to create an input for a second DAC, and wherein the first drive signal is generated based on an output of the first DAC and the second drive signal is generated based on an output of the second DAC. In addition, the dual-drive modulator may be a Mach-Zehnder modulator (MZM).

In still another aspect, the method may include receiving the two-dimensional modulated optical output at an optical receiver configured to transition from a first mode for receiving one-dimensional optical signals to a second mode for receiving two-dimensional optical signals. In addition, the optical receiver may include two MZI switches configured to transmit a one-dimensional optical signal to a first set of photodetectors in the first mode and are configured to transmit a two-dimensional optical signal to a first and second set of photodetectors in the second mode.

In yet another aspect, the method may further including receiving the two-dimensional modulated optical output at an optical receiver configured to receive optical signals in accordance with a pulse amplitude modulation and differential m-level phase shift keying (PAM-DmPSK), and wherein the optical receiver is further configured to split the optical signal into a first optical signal for identifying the pulse amplitude modulation (PAM) and a second signal for identifying the differential m-level phase shift keying (DmPSK).

Aspects of the disclosure may also include a system for two-dimensional optical signal transmission comprising: a optical signal transmitter has a digital signal processor; a first DAC and a second DAC; a first driver and a second driver; and a dual-drive modulator having a first phase modulator and a second phase modulator. The digital signal processor may be configured to map a first data set to correspond with a first dimension of an optical signal as first encoded data and a second data set to correspond with a second dimension of the optical signal as second encoded data. The first driver may be configured to generate a first drive signal and the second driver may be configured to generate a second drive signal based on outputs of the first DAC and second DAC, wherein the first drive signal represents a combination of the first encoded data and the second encoded data and the second drive signal represents a combination of the first encoded data and a differential of the second encoded data. In addition, the dual-drive modulator may be configured to receive an optical input at the first phase modulator and the second phase modulator and may be configured to receive the first drive signal at the first phase modulator and the second drive signal at the second phase modulator. In addition, the optical signal transmitter may be configured to combine the output of the first phase modulator and second phase modulator to generate a two-dimensional modulated optical output.

In accordance with other aspects, the system may be configured so that the first DAC is configured to receive the first encoded data and the second DAC may be configured to receive the second encoded data, and wherein output of the first DAC and output of the second DAC may be combined to generate the first drive signal at the first driver and the second drive signal at the second driver. In addition, the output of the first DAC may include a first voltage $V_1(t)$ and the output of the second DAC may include a second voltage $V_2(t)$. The first drive signal may correspond to a first combined voltage of $V_1(t)+V_2(t)$ and the second drive signal may correspond to second combined voltage of $V_1(t)-V_2(t)$.

The digital signal processor may be configured to digitally combining the first encoded data with the second encoded data so as to create an input for a first DAC, and digitally combining the first encoded data with a differential of the second encoded data so as to create an input for a second DAC. The first drive signal may be based on an output of the first DAC and the second drive signal is based on an output of the second DAC.

The system may also include an optical receiver configured to receive the two-dimensional modulated optical output, wherein the optical receiver may be further configured to transition from a first mode for receiving one-dimensional optical signals to a second mode for receiving two-dimensional optical signals.

The optical receiver may include two MZI switches configured to transmit a one-dimensional optical signal to a first set of photodetectors in the first mode and may be configured to transmit a two-dimensional optical signal to a first and second set of photodetectors in the second mode.

The optical receiver may be configured to receive the two-dimensional modulated optical output, and the two-dimensional modulated optical output may be modulated in accordance with a pulse amplitude modulation and a differential m-level phase shift keying (PAM-DmPSK). The optical receiver may be further configured to split the optical signal into a first optical signal for identifying the pulse amplitude modulation (PAM) and a second signal for identifying the differential m-level phase shift keying (DmPSK).

DETAILED DESCRIPTION

Figure 1:
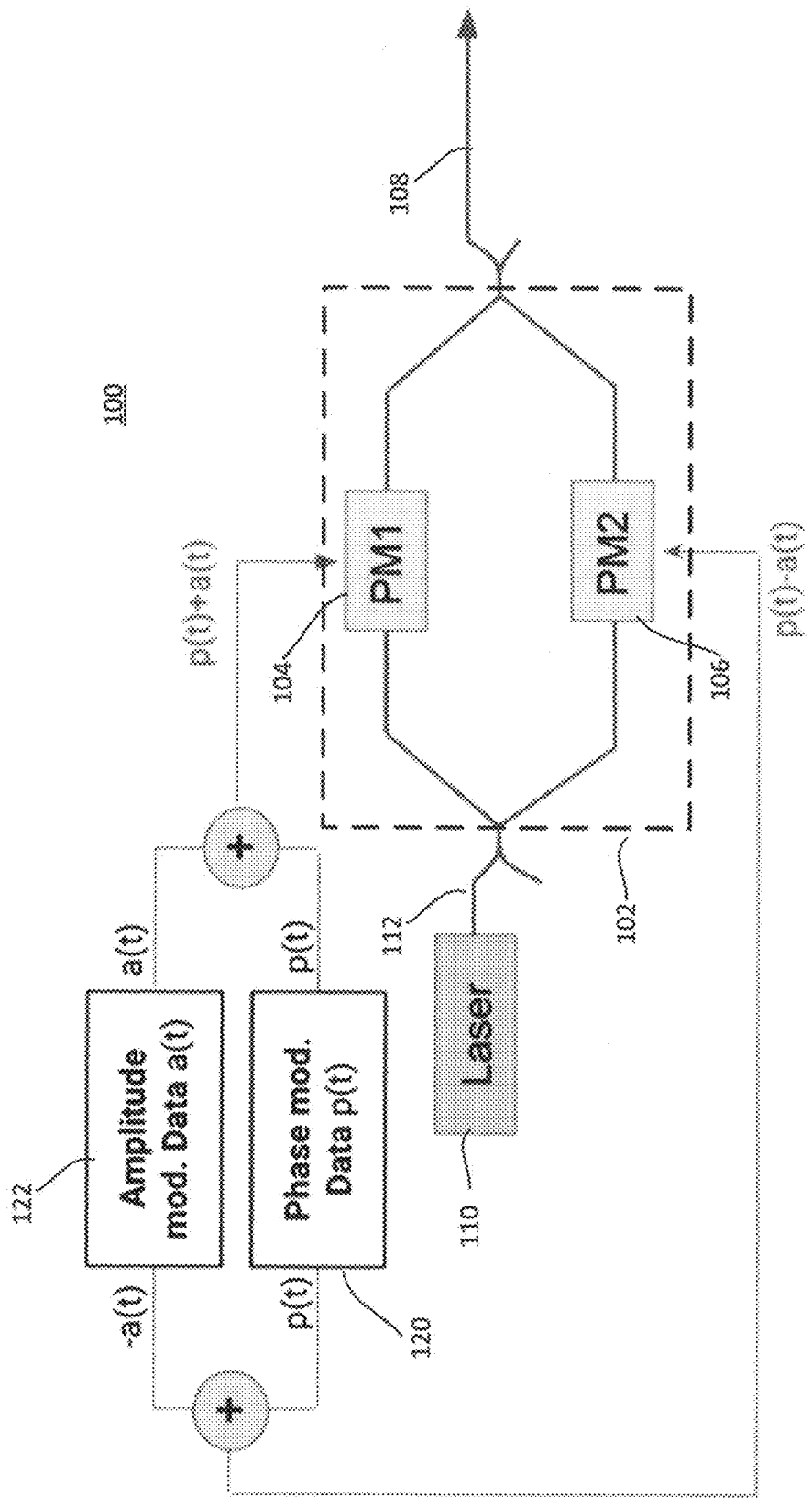
FIG. 1 is a schematic of a two-dimensional optical transmitter that is configured to provide amplitude and phase-shift keying (APSK) signals in accordance with modulator driving techniques.

FIG. 1 is a schematic illustration of optical interconnect transmitter 100 that is configured to transmit an optical signal in accordance with the a two-dimensional modulation format. Interconnect transmitter 100 may include an optical signal generator 110 and a dual-driven modulator 102. Optical signal generator 110 may be a laser, such as an O-band 1310n DFB laser, which is configured to generate a constant, unmodulated optical input signal, $E_{cw}$. Modulator 102 may be a dual-drive, null-biased Mach-Zehnder modulator (MZM) that contains a first phase modulator 104 and a second phase modulator 106. Modulator 102 receives the optical input signal $E_{cw}$ at input 112 and is configured to split the input signal between a first phase modulator 104 and a second phase modulator 106. Within an MZM, the phase modulators 104, 106 can be driven by a particular driving voltage. This driving voltage affects the extent to which the phase modulator 104, 106 will modulate the optical input signal. In a dual-drive MZM, each phase modulator 104, 106 can be independently driven.

In interconnect transmitter 100, a two-dimensional signal is partitioned into the phase and amplitude dimensions of the optical field that is modulated by modulator 102. Thus, a first data set 120 can be encoded into the phase of the modulated optical signal, while a second data set 122 can be encoded into the amplitude of the optical signal. The two data sets can be encoded as voltages that are applied to the phase modulators 104, 106 as driving signals. The phase encoding can be achieved by driving the two phase modulators 104, 106 using a common-mode driving signal p(t). The amplitude encoding can be achieved by driving the two phase modulators 104, 106 using a differential driving signal a(t) and −a(t). The common-mode driving signal and differential driving signal are each time-varying voltages, wherein the time-varying voltage values each represent a set of data. The voltages for the common-mode driving signal and differential driving signal can be combined for each phase modulator 104, 106.

For example, as shown in FIG. 1, phase modulator 104 receives a driving signal that corresponds to a voltage of p(t)+a(t), while phase modulator 106 receives a driving signal that corresponds to a voltage of p(t)−a(t). The output from each of the phase modulators 104, 106 are combined by the modulator 102 to generate a modulated optical signal output of $E_{out}(t)$, which is a modulated version of the laser signal $E_{cw}$. The modulated optical signal $E_{out}(t)$ can be transmitted by interconnect transmitter 100 via optical transmitter 108. For a null-biased MZM that is driven in this manner, the modulated optical signal output will be as follows:

$$E_{out}(t) = \frac{1}{2} E_{cw} \left\{ e^{j[\eta*p(t)+\eta*a(t)+\frac{\pi}{2}]} + e^{j[\eta*p(t)-\eta*a(t)-\frac{\pi}{2}]} \right\}$$

In the above equation, the input signal $E_{cw}$ from laser 110 is modulated in a manner that corresponds to the time-varying voltages p(t) and a(t), as well as based on the constants j and η. The j represents an imaginary number, while η represents the electrical-optical phase modulation efficiency of modulator 102 with units, such as radians/volt.

The above equation can, in turn, be expressed as follows:

$$E_{out}(t)=E_{cw}e^{j[\eta^*p(t)]}\{\sin[\eta^*a(t)]\}$$

The encoded phase modulation data is represented in the term $e^{j[\eta^*p(t)]}$, while the amplitude modulation data is represented in the term $\sin[\eta^*a(t)]$. In other words, the phase and amplitude of the modulated wave can be identified within $E_{out}(t)$ so as to determine the corresponding p(t) and a(t) signal values. As stated above, the p(t) values were selected to encode the data of a first data set 120, while the a(t) values were selected to encode the data of a second data set 122. Thus, interconnect transmitter 100 can be used in connection with an amplitude and phase-shift keying (APSK) scheme, as the data for the first data set 120 and second data set 122 can be identified based on an analysis of the phase and amplitude of the modulated output signal $E_{out}(t)$.

Figure 2:
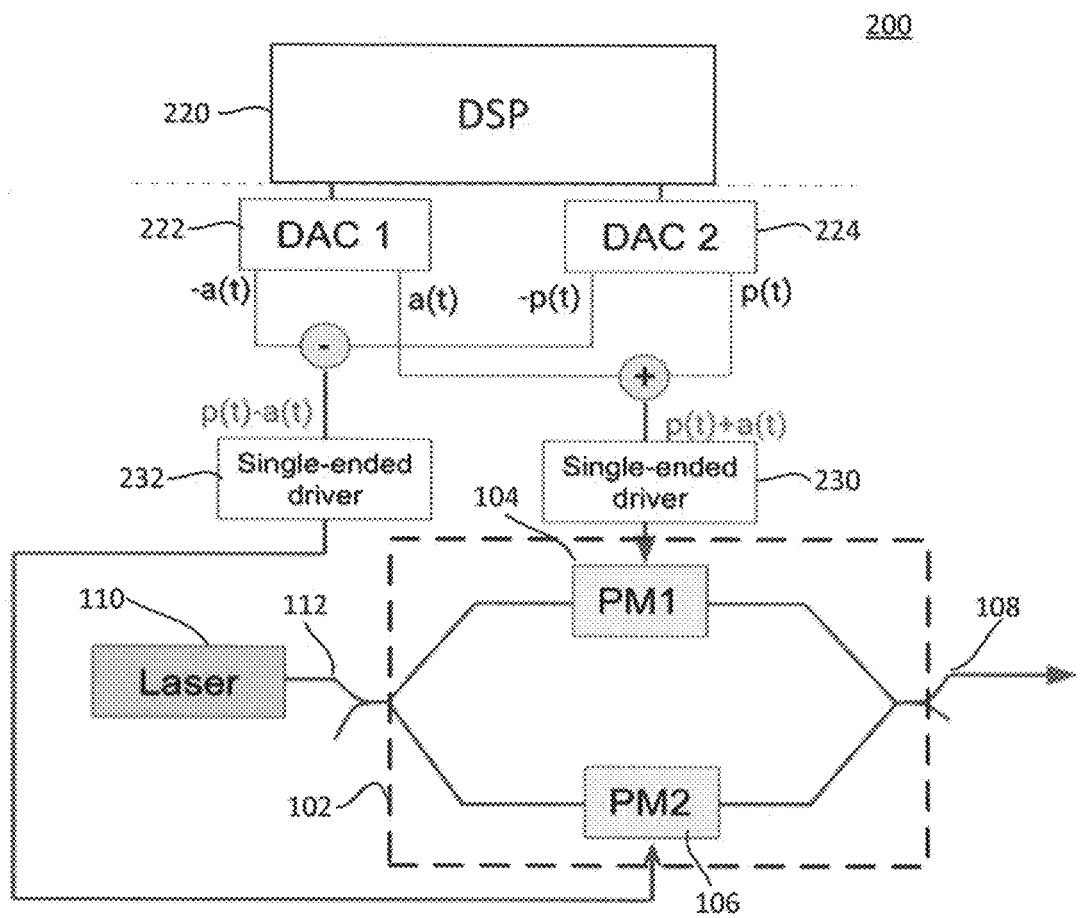
FIG. 2 is a schematic of another two-dimensional optical transmitter that is configured to provide amplitude and phase-shift keying (APSK) signals in accordance with modulator driving techniques.

FIG. 2 is a schematic of an interconnect transmitter 200 that illustrates a manner in which digital data can be encoded in the common-mode driving signal and differential driving signal, which are used for driving the phase modulators 104, 106 of modulator 102. Interconnect transmitter 200 includes a digital signal processor (DSP) 220, as well as two digital-to-analog converters (DACs), DAC 222 and DAC 224. DSP 220 may be configured to map binary bits into two-dimensional APSK symbols $\{a_0(n), p_0(n)\}$, where $a_0(n)$ represents the $n^{th}$ data value to be encoded into the amplitude dimension of the optical field, while $p_0(n)$ represents the $n^{th}$ data value to be encoded into the phase dimension of the optical field. DSP may also perform pre-compensation for potential optical impairments to the APSK symbols. For example, impairments pre-compensation may introduce interactions between $a_0(n)$ and $p_0(n)$, as a portion of $a_0(n)$ may need to be encoded into the phase of the optical field, and portion of $p_0(n)$ may need to be encoded into the amplitude of the optical field. In this instance, the pre-compensated APSK symbols may be re-partitioned as $\{a(n), p(n)\}$, where a(n) represents the sum of the portions to be encoded into the amplitude of the optical field, and p(n) represents the sum of the portions to be encoded into the phase of the optical field.

DSP 220 may be configured to provide the amplitude modulation data a(n) to DAC 222, while providing phase modulation data p(n) to DAC 224. DAC 222 may be configured to convert the a(n) data values to a voltage a(t), and it may be further configured to output a pair of voltages $\{a(t), -a(t)\}$. DAC 224 may be configured to convert the p(n) data values to a voltage p(t), and may be further configured to output a pair of voltages $\{p(t), -p(t)\}$. The output voltages of DAC 222 and DAC 224 may be combined by drivers in a manner that produces a first combined driving voltage of p(t)+a(t) and a second combined voltage of p(t)−a(t). As shown in FIG. 2, driver 230 combines the output voltages of DAC 222 and DAC 224 so as to generate a combined voltage of p(t)+a(t), which is used to drive modulator 104. Driver 232 combines the output voltages of DAC 222 and DAC 224 so as to generate a combined voltage of p(t)−a(t), which is used to drive modulator 106. Accordingly, phase modulators 104, 106 are each provided a drive signal that represents a combination of a common-mode driving signal and a differential driving signal. As discussed above, this dual-drive modulation scheme will modulate the optical input from laser 110 to produce a modulated optical output that is in a two-dimensional APSK format. This modulated optical output may be transmitted at optical transmitter 108.

Figure 3:
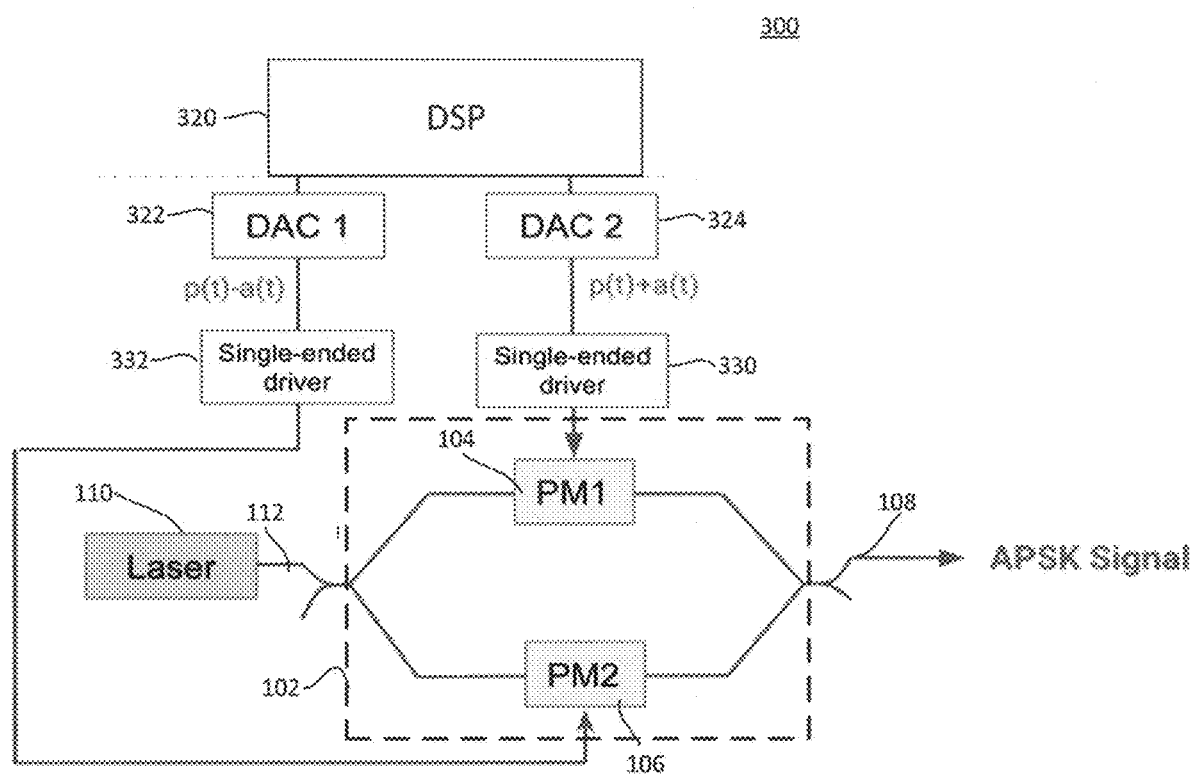
FIG. 3 is a schematic of still another two-dimensional optical transmitter that is configured to provide amplitude and phase-shift keying (APSK) signals in accordance with modulator driving techniques.

FIG. 3 is a schematic of an interconnect transmitter 300 that illustrates another manner in which digital data can be encoded into the common-mode driving signal and differential driving signal, which are used for driving the phase modulators 104, 106 of modulator 102. Unlike interconnect transmitter 200 of FIG. 2, DSP 320 of interconnect transmitter 300 is configured to combine the amplitude modulation data a(n) and the phase modulation data p(n), so that the combination occurs digitally, prior to the data being converted to voltages by DAC 322 and DAC 324.

Interconnect transmitter 300 includes a digital signal processor (DSP) 320, as well as two DAC 322 and DAC 324. DSP 320 may be configured to map binary bits into two-dimensional APSK symbols $\{a_0(n), p_0(n)\}$, where $a_0(n)$ represents the $n^{th}$ data value to be encoded into the amplitude dimension of the optical field, while $p_0(n)$ represents the $n^{th}$ data value to be encoded into the phase dimension of the optical field. DSP may also perform pre-compensation for potential optical impairments to the APSK symbols. For example, impairments pre-compensation may introduce interactions between $a_0(n)$ and $p_0(n)$, as a portion of $a_0(n)$ may need to be encoded into the phase of the optical field, and portion of $p_0(n)$ may need to be encoded into the amplitude of the optical field. In this instance, the pre-compensated APSK symbols may be re-partitioned as $\{a(n), p(n)\}$, where a(n) represents the sum of the portions to be encoded into the amplitude of the optical field, and p(n) represents the sum of the portions to be encoded into the phase of the optical field.

DSP 320 may also be configured to provide DAC 322 and DAC 324 with combined drive data values, each of which will be converted to drive signal voltages by the DACs 322, 324. In particular, for each pair $\{a(n), p(n)\}$ DSP 320 can be configured to provide DAC 322 with drive data values corresponding to a values of p(n)−a(n), while DSP 320 can provide DAC 324 with drive data values corresponding to a value of p(n)+a(n). In turn, DAC 322 will produce drive signal voltages of values p(t)−a(t), while DAC 324 will produce drive signal voltages of values p(t)+a(t). The drive signal voltage of DAC 322, p(t)−a(t), can be used by driver 332 to drive phase modulator 106, while the drive signal voltage of DAC 324, p(t)+a(t), can be used by driver 330 to drive phase modulator 104. Accordingly, phase modulators 104, 106 are each provided a drive signal that represents a combination of a common-mode driving signal and a differential driving signal. As discussed above, this dual-drive modulation scheme will modulate the optical input from laser 110 to produce a modulated optical output that is in a two-dimensional APSK format. This modulated optical output may be transmitted at optical transmitter 108.

The components of an interconnect transmitter may be more suitable for combining the phase and amplitude modulation data in an analog manner, as shown in FIG. 2, rather than in a digital manner, as shown in FIG. 3, or vice versa. For example in some applications, DACs 222, 224 of interconnect transmitter 200 may be able to operate with a lower digital resolution than the digital resolution that is needed for DACs 322, 324 of interconnect transmitter 300.

The systems and methods discussed above allow for a two-dimensional APSK optical transmission scheme that requires fewer components and less power than other two-dimensional optical techniques. For example, various inphase/quadrature (I/Q) modulators require multiple MZM modulators and phase shifters in order to generate a two-dimensional optical transmission. These methods require additional splitting and recombining of the optical signals, which can be a problem with regard to the signal power that is need and can require the use of optical amplifiers. Other techniques require additional phase modulators to be placed in series with an optical signal modulator in a manner that can result in excessive insertion loss, which can be a problem for many applications. In addition, unlike other techniques, optical receivers described herein can be made backwards compatible with current one-dimensional intensity modulation/direct detection (IM-DD) systems.

Figure 4:
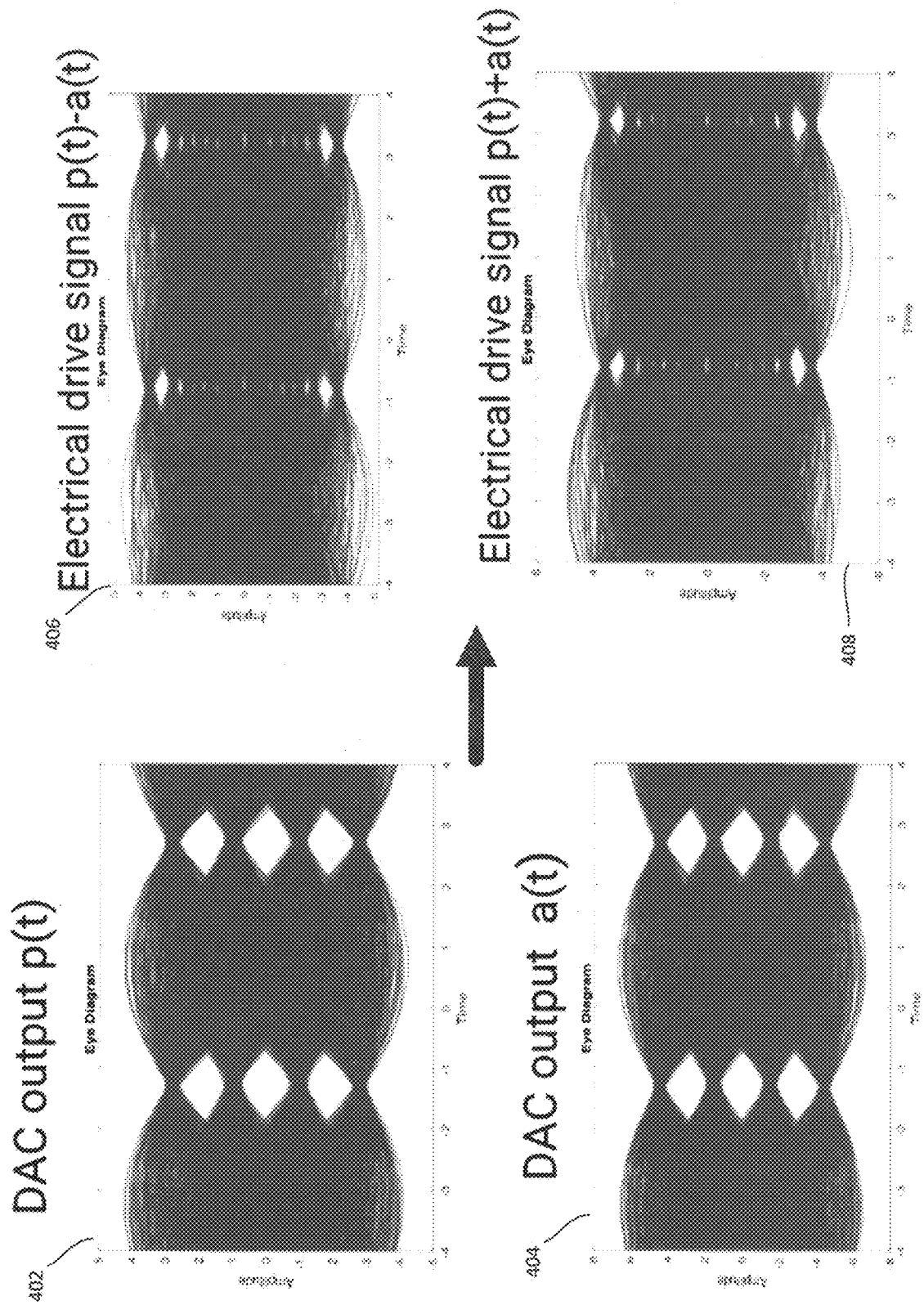
FIGS. 4 illustrates graphs of signal outputs in accordance with aspects of the disclosure.

FIG. 4 illustrates eye diagram graphs of DAC outputs for p(t) and a(t) voltages, as well as combined drive signal voltages corresponding to p(t)−a(t) and p(t)+a(t). Specifically, graph 402 has a series of voltage amplitudes that represent phase modulation voltages p(t) over a particular time period, while graph 404 has a series of voltage amplitudes that represent amplitude modulation voltages a(t) over the same time period as graph 402. As discussed above, the p(t) voltages may be used as a common-mode driving signal, while the a(t) voltages may be used as a differential driving signal. When the p(t) and a(t) voltages are combined in this manner, a combined voltage signal representing p(t)−a(t) and a combined voltage signal representing p(t)+a(t) may be produced. The amplitudes of the p(t)−a(t) voltage signals are shown in graph 406, while the amplitudes of the p(t)+a(t) voltage signals are shown in graph 408.

Figure 5:
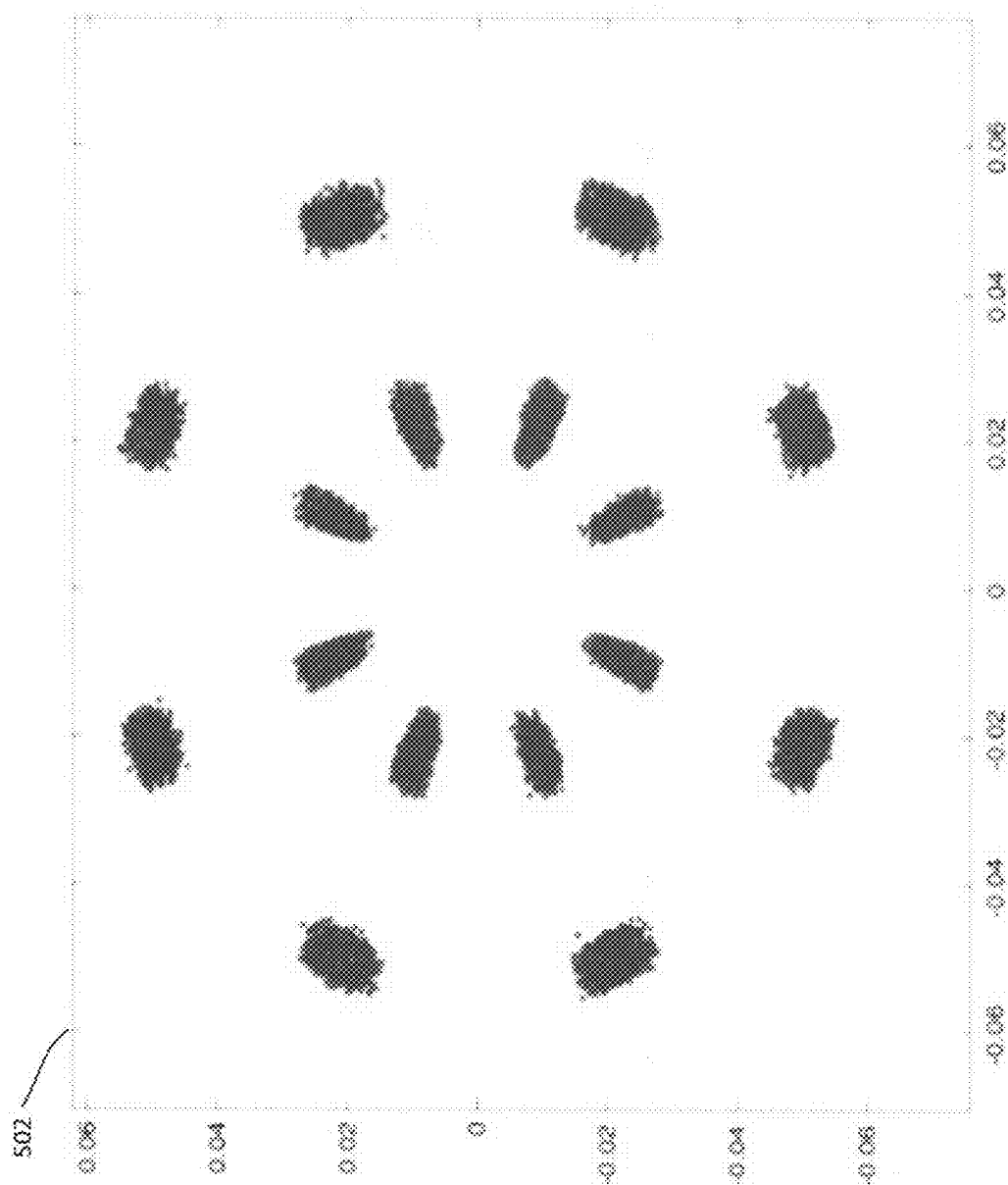
FIG. 5 illustrates a phase diagram of signal outputs in accordance with aspects of the disclosure.
Figure 6:
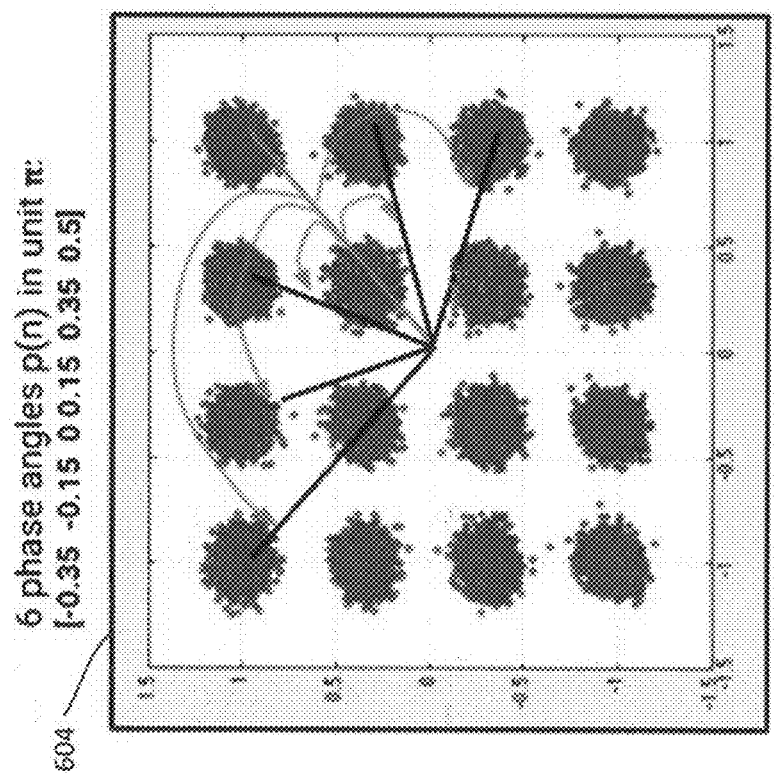
FIG. 6 illustrates phase diagrams of signal output in accordance with aspects of the disclosure.
Figure 6:
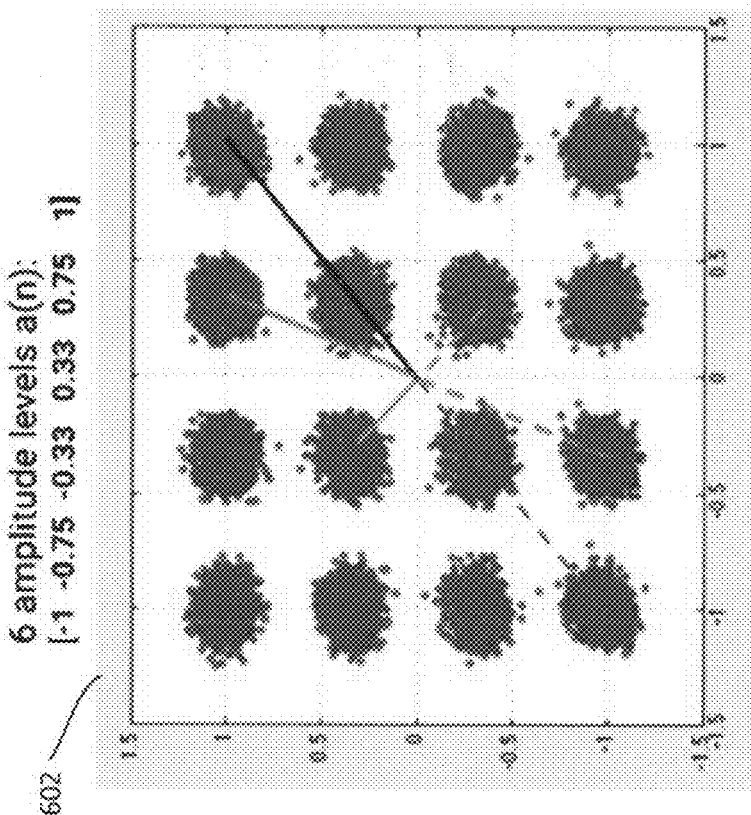

In FIG. 5 a phase diagram 502 illustrates that the p(t)−a(t) and p(t)+a(t) voltages of FIG. 4 can be used to generate a star-16 quadrature amplitude modulation (QAM) type 16APSK when a single MZM driven based on a four level amplitude data signal a(n) and a four level phase data signal p(n) in the manner described herein. The X-axis represents the inphase optical signal components, while the Y-axis represents the quadrature optical signal components. In FIG. 6, phase diagrams 602 and 604 illustrate that square 16QAM type 16APSK can also be generated by driving a single MZM with an unequally-spaced 6-level amplitude signal a(n) and an unequally-spaced 6-level phase signal p(n), wherein one phase modulator of the MZM is driven by p(t)−a(t) voltages and the other phase modulator of the MZM is driven by p(t)+a(t) voltages. As an illustration example, the 6-level amplitude signal a(n) can be given by [−1 −0.75 −0.33 0.33 0.75 1] in linear units, and the 6-level phase angle signal p(n) can be given by [−0.35 −0.15 0 0.15 0.35 0.5] in unit pi ($\pi$).

Figure 7:
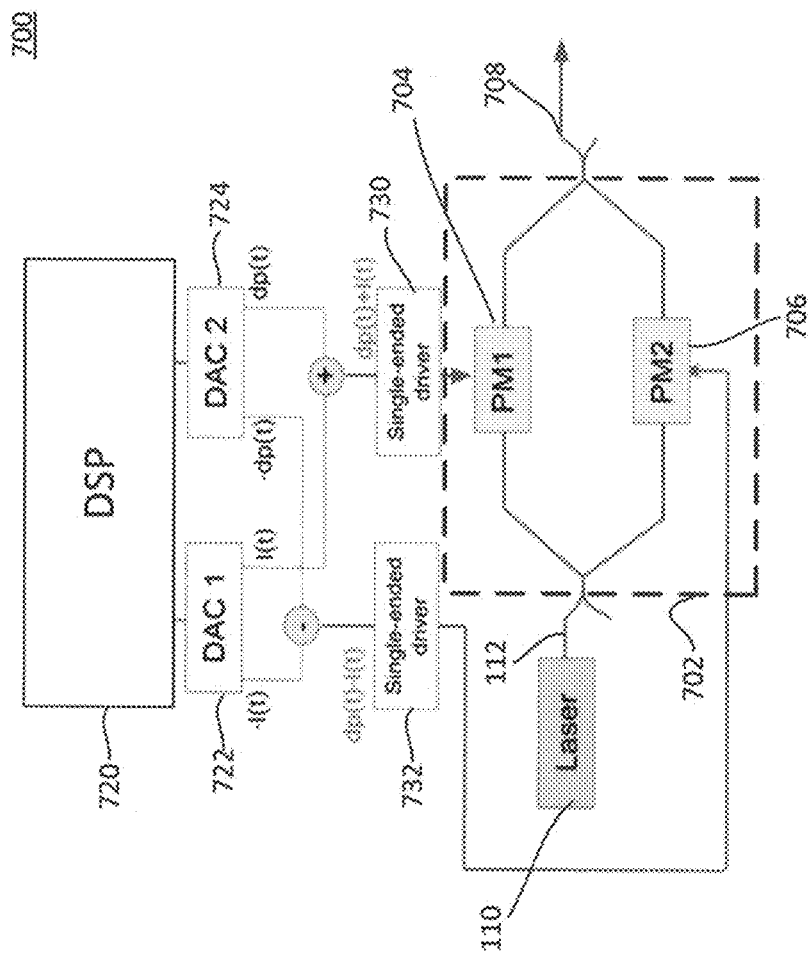
FIG. 7 is a schematic of another two-dimensional optical transmitter that is configured to provide pulse amplitude modulation and differential m-level phase shift keying (PAM-DmPSK) signals in accordance with modulator driving techniques.

In accordance with aspect of the disclosure, the technique of using common-mode driving signals in combination differential driving signals to generate a two-dimensional optical signal may also be accomplished by encoding data with respect to the intensity of transmitted light and the phase variation (or differential phase) of the optical field. For example, FIG. 7 illustrates a interconnect transmitter 700 that is configured to encode data into an optical signal by modulating the intensity of an optical signal and the differential phase of an optical signal. While certain modulation techniques described above are referred to as using an amplitude and phase-shift keying (APSK) modulation scheme, interconnect transmitter 700 can be referred to as using pulse amplitude modulation and differential m-level phase shift keying (PAM-DmPSK) modulation scheme. Interconnect transmitter 700 may be configured to encode the PAM signal data, I(n), into the intensity of the light by biasing the MZM 702 at or close to the quadrature point and differentially driving the phase modulators 704 and 706 of MZM 702 with voltages that are based on differential driving signals I(t) and Ī(t). The DmPSK signal data, dp(n), may be encoded into the phase variation of the optical field by driving both phase modulators 704 and 706 with a common-mode driving signal dp(t).

DSP 720 may be configured to map binary bits into two-dimensional PAM-DmPSK symbols $\{I_0(n), dp_0(n)\}$, where $I_0(n)$ represents the $n^{th}$ data value to be encoded into the intensity of light, while $dp_0(n)$ represents the $n^{th}$ data value to be encoded into the differential phase of the optical signal. To generate the common-mode driving signal dp(t), DSP 720 may use a circular phase differential pre-encoder. For example, if the desired DmPSK symbol is $dp_0(n)$, then the circular differential pre-encoder of DSP 720 may generate data signal output dp(n) in accordance with the following equation:

$$dp(n)=dp(n-1)+dp_0(n) \bmod 2\pi$$

where, the first dp(n) is assumed to be 0.

In addition, the DmPSK phase alphabet or constellation $\beta_k$ may be chosen such that $\cos(\beta_k)$ has equal spacing and distinct values. For example, a D2PSK phase symbol constellation can be [0, $\pi$], a D3PSK phase symbol constellation can be, and a D4PSK phase symbol constellation can be [0, 0.39$\pi$, 0.61$\pi$, $\pi$]. These phase symbol constellations can be used so that the DmPSK signal can be demodulated by a single delay interferometer using differential detection techniques described herein. Accordingly, the disclosed techniques allow for operation using fewer components, as multiple delay interferometers are not required.

In connection with the PAM-DmPSK two-dimensional modulation, a limited PAM modulation extinction ratio (ER) can be used so that a sufficient optical field exists to encode the DmPSK signal. For various applications, including short-reach systems using an MZM, a modulation ER of less than 5 to 7 dB can be used, which is sufficient for encoding the DmPSK signal.

DSP 720 may also perform pre-compensation for potential optical impairments to the symbols. For example, impairments pre-compensation may introduce interactions between $I_0(n)$ and $dp_0(n)$. In this instance, the pre-compensated symbols may be re-partitioned as $\{I(n), dp(n)\}$, where I(n) represents the sum of the portions to be encoded into the intensity of light, and dp(n) represents the sum of the portions to be encoded into the differential phase of the optical field.

DSP 720 may be configured to provide the intensity modulation data I(n) to DAC 722, while providing differential phase modulation data dp(n) to DAC 724. DAC 722 may be configured to convert the I(n) data values to a voltage I(t), and it may be further configured to output a pair of voltages $\{I(t), -I(t)\}$. DAC 724 may be configured to convert the dp(n) data values to a voltage dp(t), and may be further configured to output a pair of voltages $\{dp(t), -dp(t)\}$. The output voltages of DAC 222 and DAC 224 may be combined by drivers in a manner that produces a first combined driving voltage of dp(t)+I(t) and a second combined voltage of dp(t)−I(t). As shown in FIG. 7, driver 730 combines the output voltages of DAC 722 and DAC 724 so as to generate a combined voltage of dp(t)+I(t), which is used to drive phase modulator 704. Driver 732 combines the output voltages of DAC 722 and DAC 724 so as to generate a combined voltage of dp(t)−I(t), which is used to drive phase modulator 706. Accordingly, phase modulators 704, 706 are each provided a drive signal that represents a combination of a common-mode driving signal dp(t) and a differential driving signal I(t). As discussed above, this dual-drive modulation scheme will modulate the optical input from laser 110 to produce a modulated optical output that is in a two-dimensional PAM-DmPSK format. This modulated optical output may be transmitted at optical transmitter 708.

When the modulator 702 is driven in the manner described above, an optical laser input of $E_{cw}$ will be modulated to an $E_{out}(t)$ as follows:

$$E_{out}(t) = E_{cw}e^{j[\eta*dp(t)]}\left\{\sin\left[\eta*I(t) + \frac{\pi}{4}\right]\right\}$$

Where η represents the electrical-optical phase modulation efficiency. The DmPSK modulation signal can be identified based on the term $e^{j[\eta*dp(t)]}$, while the IM-DD PAM modulation signal can be identified based on the term $$\sin\left[\eta*I(t) + \frac{\pi}{4}\right].$$

With regard to receiving the two-dimensional optical signals discussed above, the current disclosure also provides for a dual-mode receiver that is capable of operating in a first mode, where the receiver is able to coherently receiving a 2D APSK signal, or it can operate in a second mode, where the receiver is capable of coherently receiving a one-dimensional IM-DD signal. This dual-mode receiver may therefore act as a backward compatible receiver that is capable of operating in a 1D IM-DD signal environment, as well as in a 2D APSK signal environment.

Figure 8:
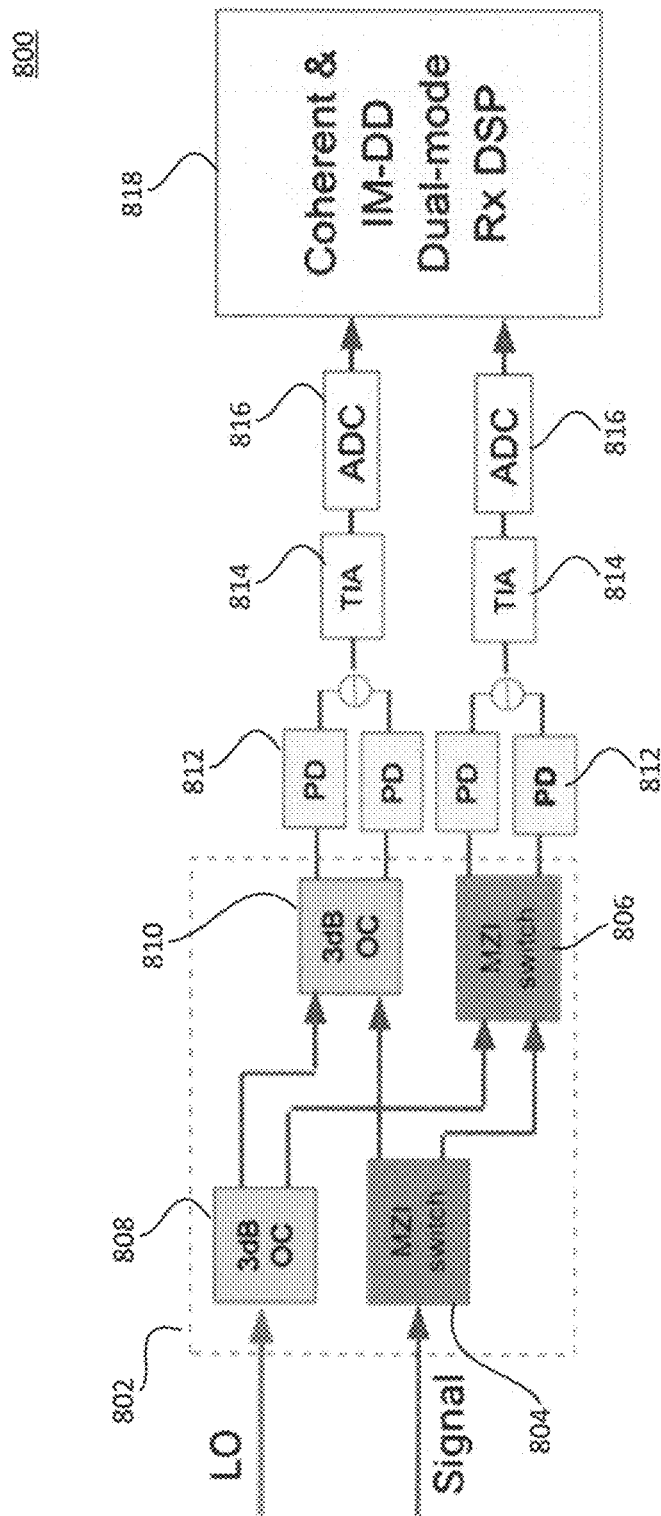
FIG. 8 is a schematic of a dual-mode receiver configured to receive one-dimensional or two-dimensional optical signals.

FIG. 8 is a schematic of a dual-mode receiver 800 for receiving either 2D APSK signals or 1D IM-DD signals. Dual-mode receiver 800 may contain an optical front end 802 that includes two Mach-Zehnder interferometer (MZI) switches 804 and 806, as well as may two 3 dB optical couplers 808 and 810. When operating as a two-dimensional coherent receiver, the MZI switches 804, 806 are arranged so as to function as 3 dB couplers. Therefore, the two-dimensional signal is passed to both pairs of photodetectors 812. When operating in the 1D IM-DD receiver mode, the two MZI switches 804, 806 are arranged to function as two 1:2 switches, so that the signal is routed to only one of the photodetector pairs 812, while a local oscillator (LO) light is routed to the other photodetector pair to avoid signal interference. The signals from the pairs of photodetectors 812 may then be passed to transimpedance amplifiers 814, so as to amplify the signal. The amplified signals may then be passed to analog-to-digital converters (ADCs) 816. The ADCs 816 may provide a digital output to a dual-mode DSP 818, which is configured to operate either as a two-dimensional mode or a one-dimensional mode.

Figure 9:
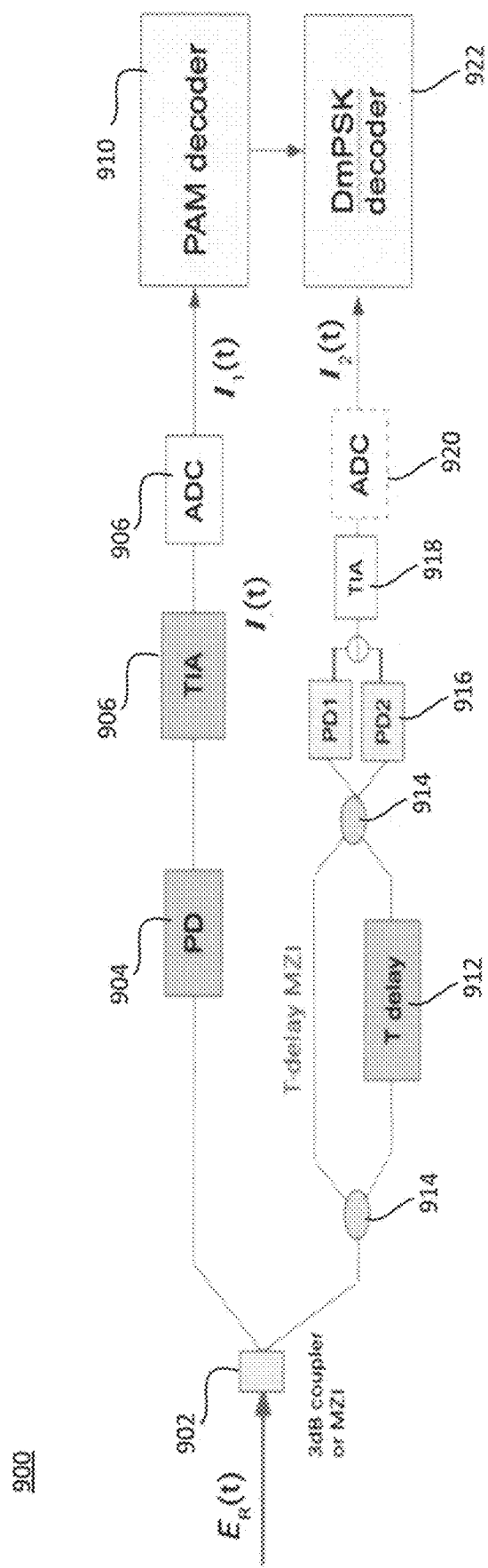
FIG. 9 is a schematic of a receiver configured to decode two-dimensional PAM-DmPSK signals.

FIG. 9 is a schematic of a receiver 900 that is capable of detecting a two-dimensional PAM-DmPSK signal. Receiver 900 may receive an optical signal $E_R(t)$ at a signal splitter 902, which may be any suitable signal splitter, including a 3 dB coupler or MZI-based splitter. The optical signal may be split into a first signal that is used to detect the PAM signal I(n) with a direct detection circuit, while the second signal is used to detect the differential modulated phase signal dp(n) using a symbol-delay (T-delay) MZI with a balanced photodetector. As shown in FIG. 9, the first signal may be transmitted through photodetector 904, a transimpedance amplifier 906, an ADC 908, and a PAM decoder 910. The second signal may be transmitted through 3 dB couplers 912 that are arranged as part of a T-delay MZI 914. The second signal may then be sent to a pair photodetectors 916, a transimpedance amplifier 918, an ADC 920, and a DmPSK decoder 922.

Using receiver 900, the PAM signal and the DmPSK signal can be detected and decoded independently from one another, however the PAM decoder 910 may be configured to provide an output to DmPSK decoder 922. In particular, the eye opening of the detected DmPSK signal can be impacted by a PAM4 signal, while a PAM4 signal eye opening is not impacted by the DmPSK signal. Thus, the detected PAM signal can be decoded first, and the detected PAM signal can then be used in connection with the DmPSK decoding.

Figure 10:
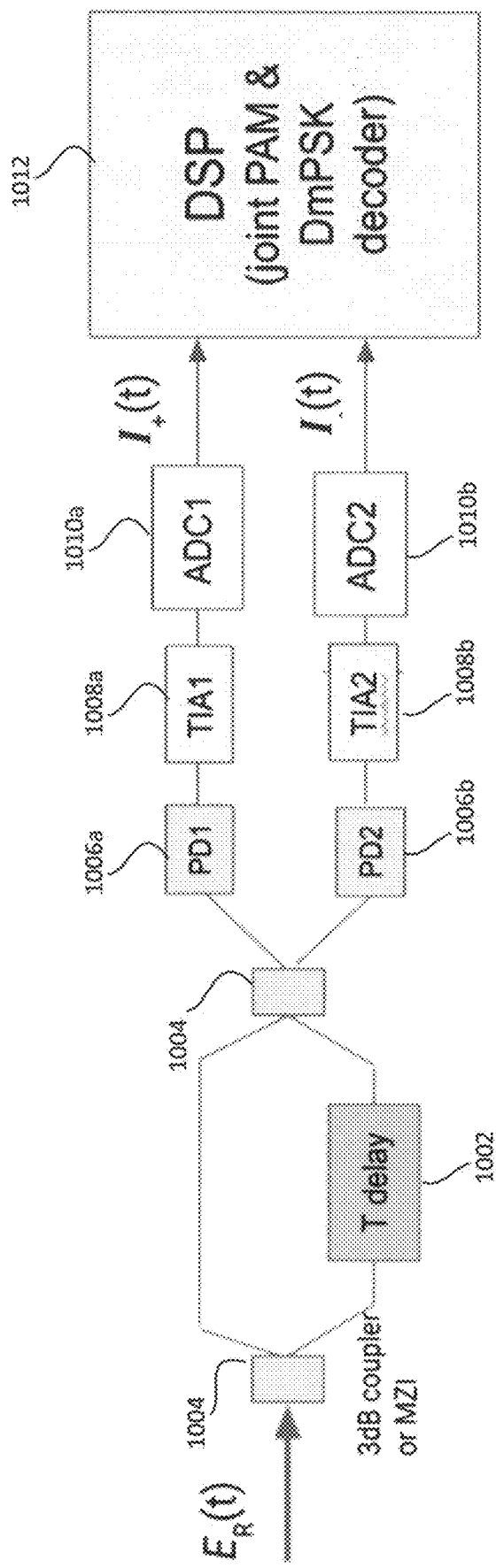
FIG. 10 is a schematic of another receiver configured to decode two-dimensional PAM-DmPSK signals.

FIG. 10 is a schematic of a receiver 1000 that is capable of detecting a PAM-DmPSK signal using a single DSP 1012. In receiver 1000, an input signal $E_R(t)$ is split in connection with a T-delay MZI 1002. The signal splitter 1004 may be any suitable signal splitter, including a 3 dB coupler or MZI-based splitter. The two outputs of the T-delay MZI 1002 are each detected using independent pairs of photodetectors 1006 and transimpedance amplifiers 1010. The signals are also The PAM and DmPSK signals may then be jointly processed.

If $I_+(t)$ represents the signals detected by photodetector 1006a and transimpedance amplifier 1008a, and $I_-(t)$ represents the signals detected by photodetector 1006b and transimpedance amplifier 1008b, then $I_+(t)$ and $I_-(t)$ can be represented as follows:

$$I_+(t) \propto \eta I(t) + \eta I(t-T) + \quad \text{Eq (1)}$$
$$2\left\{\sin\left[\eta I(t) + \frac{\pi}{4}\right]\right\}\left\{\sin\left[\eta I(t-T) + \frac{\pi}{4}\right]\right\}\cos(\eta dp(t))$$

$$I_-(t) \propto \eta I(t) + \eta I(t-T) - \quad \text{Eq (2)}$$
$$2\left\{\sin\left[\eta I(t) + \frac{\pi}{4}\right]\right\}\left\{\sin\left[\eta I(t-T) + \frac{\pi}{4}\right]\right\}\cos(\eta dp(t))$$

Where η denotes the electrical-optical phase modulation efficiency and T represents a delay time. The above can also be represented as follows:

$$I_+(t) + I_-(t) \propto \eta I(t) + \eta I(t-T) \quad \text{Eq (3)}$$

$$I_+(t) - \quad \text{Eq (4)}$$
$$I_-(t) \propto 4\left\{\sin\left[\eta I(t) + \frac{\pi}{4}\right]\right\}\left\{\sin\left[\eta I(t-T) + \frac{\pi}{4}\right]\right\}\cos(\eta dp(t))$$

The PAM signal I(n) can be identified in connection with Eq (3), from $I_+(t)+I_-(t)$, by using partial response signaling based signaling recovery methods, such as by using maximum likelihood sequence estimation (MLSE) based methods. After the PAM signal is determined, the determined PAM signal and Eq(4) for $I_+(t)-I_-(t)$ can be used to determine the DmPSK signal dp(n). Accordingly, receiver 1000 may be used to jointly decode the PAM modulations and the DmPSK modulations of a 2D PAM-DmPSK signal.

Figure 11:
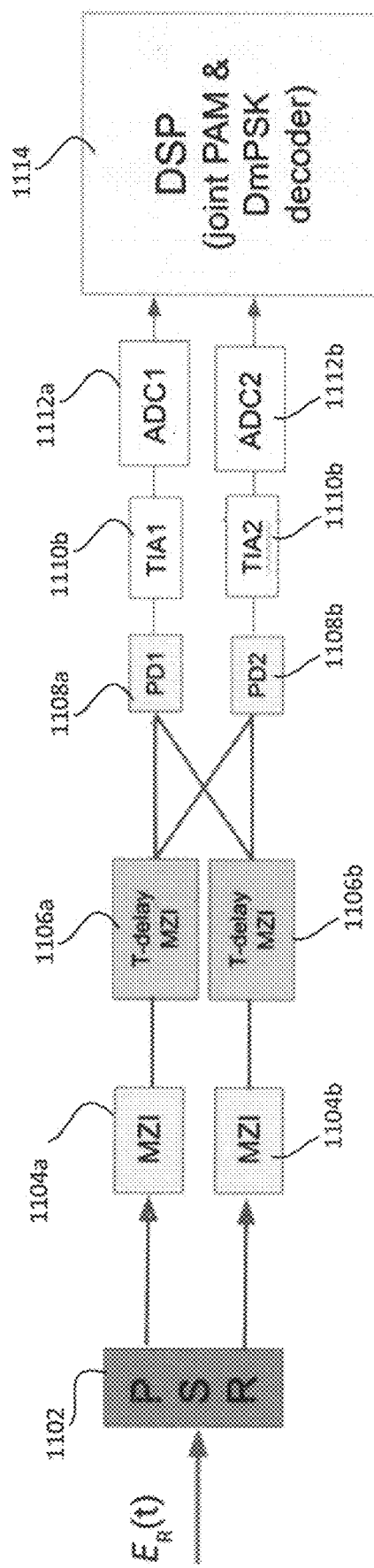
FIG. 11 is a schematic of still another receiver configured to decode two-dimensional PAM-DmPSK signals.

FIG. 11 shows a receiver 1100 that can be used for implementation of a polarization-diversity PAM-DmPSK detection. Polarization-diversity may be desirable or needed in connection with certain integrated optical circuits, such as Silicon photonics-based optical integrated circuits in which optical components, such as the delay MZI are polarization dependent. Receiver 1100 contains a polarization-splitter and rotator (PSR) 1102, which receives the input signal $E_R(t)$. The PSR 1102 separates the input signal into transverse electric (TE) wave mode and transverse magnetic (TM) wave mode. In addition, the PSR 1102 may also convert the separate TM mode into TE mode or vice versa. Accordingly, the TM mode may be transmitted as converted TE' mode, or the TE mode may be transmitted as a converted TM' mode. The TE and TE' or the TM and TM' signals may each be sent to an MZI and to a T-delay MZI. For example, the TE mode from PSR 1102 may be sent to MZI 1104a and T-delay MZI 1106a, while the TE' signal may be sent to MZI 1104b and T-delay MZI 1106b. The two outputs of each of the T-delay MZIs 1106a, 1106b may then be sent to two independent dual-input photodetectors 1108a, 1108b. The output of the photodetectors may then each be transmitted to a transimpedance amplifier 1110a, 1110b, and then to ADCs 1112a, 1112b. A DSP 1114 may then be configured to jointly decode the PAM modulation and the DmPSK modulation of the received two-dimensional PAM-DmPSK signal.

Figure 12:
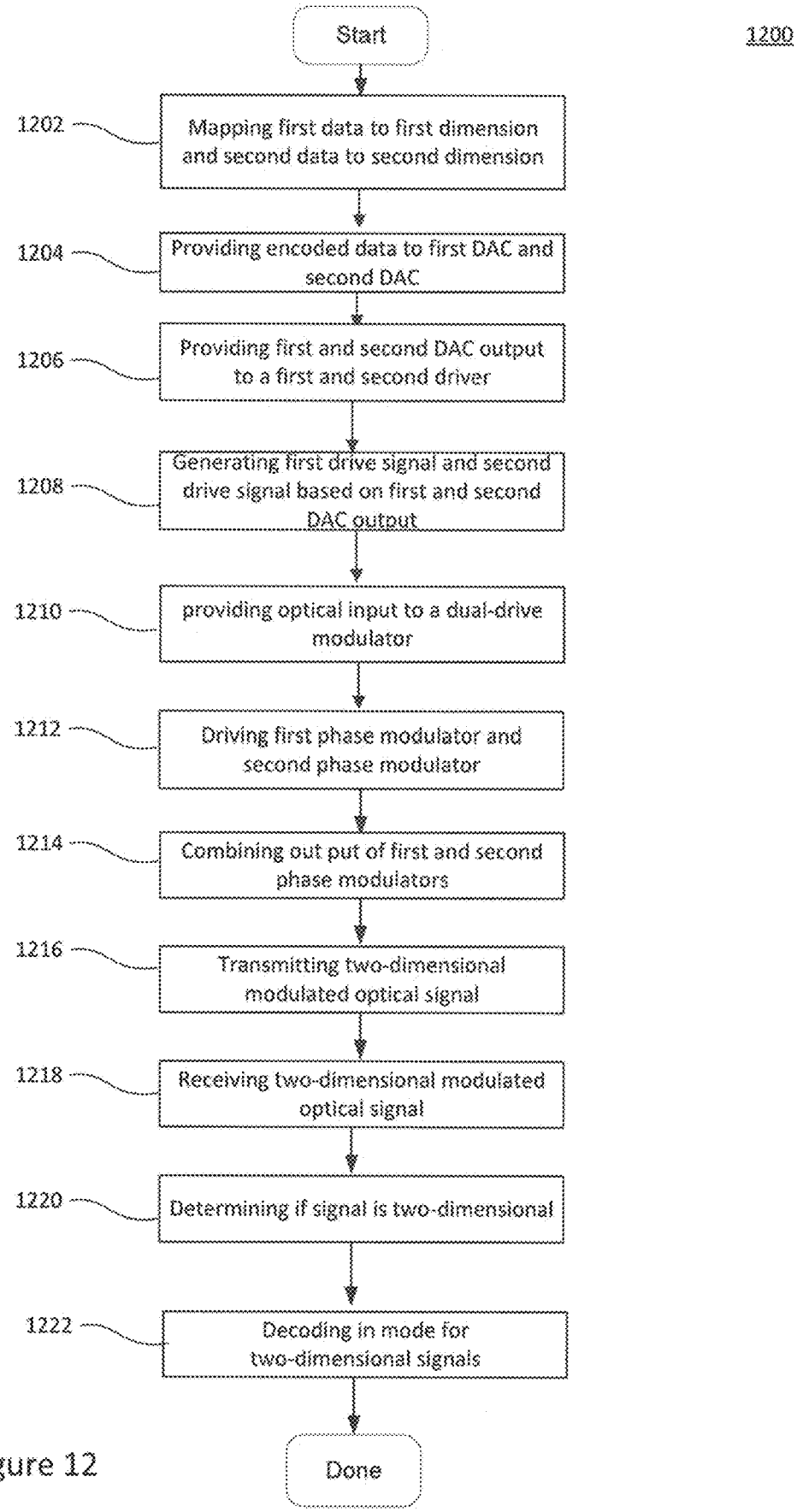
FIG. 12 is a flow chart in accordance with aspects of the disclosure.

FIG. 12 is a flow chart 1200 that describes operations that may be performed in connection with the systems described above. Some operations may be skipped and other operations added in accordance with aspects described above. In addition, some operations may be performed simultaneously or in an alternative order in accordance with the disclosure. At block 1202, a first data set may be mapped in connection with a first dimension of an optical signal, while a second data set may be mapped in connection with a second dimension of an optical signal. As described above, this mapping may be performed by a DSP of an optical transmitter.

The mapping may be performed by mapping binary bits into 2D APSK symbols $\{a_0(n), p_0(n)\}$, where $a_0(n)$ represents the $n^{th}$ data value to be encoded into the amplitude dimension of the optical field, while $p_0(n)$ represents the $n^{th}$ data value to be encoded into the phase dimension of the optical field. DSP may also perform pre-compensation for potential optical impairments to the APSK symbols. For example, impairments pre-compensation may introduce interactions between $a_0(n)$ and $p_0(n)$, as a portion of $a_0(n)$ may need to be encoded into the phase of the optical field, and portion of $p_0(n)$ may need to be encoded into the amplitude of the optical field. In this instance, the pre-compensated APSK symbols may be re-partitioned as further mapping of $\{a(n), p(n)\}$, where $a(n)$ represents the sum of the portions to be encoded into the amplitude of the optical field, and $p(n)$ represents the sum of the portions to be encoded into the phase of the optical field.

Alternatively, the mapping may be performed by mapping binary bits into two-dimensional PAM-DmPSK symbols $\{I_0(n), dp_0(n)\}$, where $I_0(n)$ represents the $n^{th}$ data value to be encoded into the intensity of light, while $dp_0(n)$ represents the $n^{th}$ data value to be encoded into the differential phase of the optical signal. Impairments pre-compensation may introduce interactions between $I_0(n)$ and $dp_0(n)$. In this instance, the pre-compensated symbols may be re-partitioned so as to be mapped as $\{I(n), dp(n)\}$, where $I(n)$ represents the sum of the portions to be encoded into the intensity of light, and $dp(n)$ represents the sum of the portions to be encoded into the differential phase of the optical field.

At block 1204, the encoded data that has been mapped to correspond with the two optical dimensions may be provided to a first DAC and a second DAC. As discussed in connection with FIG. 2, the DSP may provide the first DAC with an input that corresponds to the encoded data for a first dimension, and the DSP may provide the second DAC with an input that corresponds to the encoded data for the second dimension. Alternatively, the DSP may provide the first and second DACs with a combination of the encoded data for the first and second dimensions. For example, the DSP may combine the encoded phase data $p(n)$ as a common-mode input, while the encoded amplitude data $a(n)$ may be combined as a differential input, so that the first DAC receives an input corresponding to $p(n)+a(n)$, while the second DAC receives an input corresponding to $p(n)-a(n)$.

At block 1206, the first and second DACs provide an output to a first and second driver. As discussed above, if the first DAC is provided with an input that corresponds to a single dimension, such as $p(n)$, then the first DAC's output voltage will correspond to a single dimension $p(t)$. The same will be true for the second DAC's input of $a(n)$ and output of $a(t)$. In this instance, the output voltages of the first and second DACs may be combined in the manner discussed in connection with FIG. 2, wherein the output voltages of the first and second DACs are combined at the first driver to produce a voltage of $p(t)+a(t)$, while the output voltages of the first and second DACs are combined at the second driver to produce a voltage of $p(t)-a(t)$. In this way the $p(t)$ voltage is combined with $a(t)$ as a common-mode signal, while $a(t)$ is combined with $p(t)$ as a differential signal.

Alternatively, if the first DAC is provided with an input of $p(n)+a(n)$, it will produce an output of $p(t)+a(t)$, and this output can be transmitted directly to the first driver. Likewise if the second DAC receives an input of $p(n)-a(n)$, then output of the second DAC, $p(t)-a(t)$, may be transmitted directly to the second driver.

At block 1208, a first driver may generate a first drive signal for being applied to a first phase modulator, and a second driver may generate a second drive signal for being applied to a second phase modulator. For example for a 2D APSK modulation, the first driver will receive an input corresponding to a voltage of $p(t)+a(t)$, while the second driver will receive an input corresponding to a voltage of $p(t)-a(t)$. Accordingly, the encoded phase data will be applied to the first and second phase modulators as a common-mode signal, while the encoded amplitude data will be applied as a differential signal. Alternatively, for a 2D PAM-DmPSK modulation, the first driver will receive an input corresponding to a voltage of $dp(t)+I(t)$, while the second driver will receive an input corresponding to a voltage of $dp(t)-I(t)$. Accordingly, the encoded differential phase data will be applied as a common-mode signal, while the encoded light intensity data will be applied as a differential signal.

At block 1210, an optical input, such as an input from a laser, may be applied to a dual-drive modulator having a first and second phase modulator. In addition, the drive signal from the first driver may be applied to the first phase modulator, while the drive signal from the second driver may be applied to the second phase modulator (block 1212). The output of the first and second phase modulators may be combined to generate a two-dimensional modulated optical signal (block 1214). At block 1216, the optical transmitter may transmit the two-dimensional modulated optical signal. This transmission may occur over one or more optical fibers. An optical receiver may receive the transmitted two-dimensional modulated optical signal (block 1218). As discussed above, the optical receiver may be a dual-mode receiver that is configured to operate in a first mode for receiving one-dimensional signals and a second mode for receiving two-dimensional signals. At block 1220, the optical receiver may determine if the received signal is a two-dimensional signal. This may be achieved by an out-of-band communication channel, such as a control plane channel that can be implemented in an optical network. If the received signal is a two-dimensional signal, the optical receiver may decode the signal in accordance with an operation mode for two-dimensional signals (block 1222).

Although the subject matter herein has been described with reference to particular examples, it is to be understood that these examples are merely illustrative and not limiting. It is therefore to be understood that numerous modifications may be made to the illustrative examples and that other arrangements may be devised without departing from the spirit and scope of the appended claims.

The invention claimed is:

1. A method for two-dimensional optical signal transmission comprising:
    mapping, by a digital signal processor, a first data set to correspond with a first dimension of an optical signal as first encoded data and a second data set to correspond with a second dimension of the optical signal as second encoded data;
    generating a first drive signal and a second drive signal based on outputs of a first digital-to-analog converter (DAC) and a second DAC, wherein the first drive signal represents a combination of the first encoded data and the second encoded data and the second drive signal represents a combination of the first encoded data and a differential of the second encoded data;
    providing an optical input to a dual-drive modulator having a first phase modulator and a second phase modulator;
    driving the first phase modulator with the first drive signal and the second phase modulator with the second drive signal;
    combining the output of the first phase modulator and second phase modulator to generate a two-dimensional modulated optical output.

2. The method of claim 1, wherein the first dimension is a phase of the optical signal and the second dimension is an amplitude of the optical signal.

3. The method of claim 1, wherein the first dimension is a phase variation of the optical signal and the second dimension is a light intensity of the optical signal.

4. The method of claim 1, wherein generating the first drive signal and the second drive signal further comprises transmitting the first encoded data to the first (DAC) and transmitting the second encoded data to the second DAC, and wherein output of the first DAC and output of the second DAC are combined to generate the first drive signal and the second drive signal.

5. The method of claim 4, wherein the output of the first DAC comprises a first voltage $V_1(t)$ and wherein the output of the second DAC comprises a second voltage $V_2(t)$, and wherein the first drive signal corresponds to a first combined voltage of $V_1(t)+V_2(t)$ and the second drive signal corresponds to second combined voltage of $V_1(t)-V_2(t)$.

6. The method of claim 1, wherein generating the first drive signal and the second drive signal further comprises digitally combining the first encoded data with the second encoded data so as to create an input for a first DAC, and digitally combining the first encoded data with a differential of the second encoded data so as to create an input for a second DAC, and wherein the first drive signal is generated based on an output of the first DAC and the second drive signal is generated based on an output of the second DAC.

7. The method of claim 1, wherein the dual-drive modulator comprises a Mach-Zehnder modulator (MZM).

8. The method of claim 1, further comprising receiving the two-dimensional modulated optical output at an optical receiver configured to transition from a first mode for receiving one-dimensional optical signals to a second mode for receiving two-dimensional optical signals.

9. The method of claim 8, wherein the optical receiver comprises two MZI switches configured to transmit a one-dimensional optical signal to a first set of photodetectors in the first mode and are configured to transmit a two-dimensional optical signal to a first and second set of photodetectors in the second mode.

10. The method of claim 1, further comprising receiving the two-dimensional modulated optical output at an optical receiver configured to receive optical signals in accordance with a pulse amplitude modulation and differential m-level phase shift keying (PAM-DmPSK), and wherein the optical receiver is further configured to split the optical signal into a first optical signal for identifying the pulse amplitude modulation (PAM) and a second signal for identifying the differential m-level phase shift keying (DmPSK).

11. A system for two-dimensional optical signal transmission comprising:
    an optical signal transmitter comprising:
        a digital signal processor;
        a first digital-to-analog converter (DAC) and a second DAC;
        a first driver and a second driver; and
        a dual-drive modulator having a first phase modulator and a second phase modulator,
        wherein, the digital signal processor is configured to map a first data set to correspond with a first dimension of an optical signal as first encoded data and a second data set to correspond with a second dimension of the optical signal as second encoded data,
        wherein the first driver is configured to generate a first drive signal and the second driver is configured to generate a second drive signal based on outputs of the first DAC and second DAC, wherein the first drive signal represents a combination of the first encoded data and the second encoded data and the second drive signal represents a combination of the first encoded data and a differential of the second encoded data,
        wherein the dual-drive modulator is configured to receive an optical input at the first phase modulator and the second phase modulator and is configured to receive the first drive signal at the first phase modulator and the second drive signal at the second phase modulator,
        and wherein the optical signal transmitter is configured to combine the output of the first phase modulator and second phase modulator to generate a two-dimensional modulated optical output.

12. The system of claim 11, wherein the first dimension is a phase of the optical signal and the second dimension is an amplitude of the optical signal.

13. The system of claim 11, wherein the first dimension is a phase variation of the optical signal and the second dimension is a light intensity of the optical signal.

14. The system of claim 11, wherein the first DAC is configured to receive the first encoded data and the second DAC is configured to receive the second encoded data, and wherein output of the first DAC and output of the second DAC are combined to generate the first drive signal at the first driver and the second drive signal at the second driver.

15. The system of claim 14, wherein the output of the first DAC comprises a first voltage $V_1(t)$ and wherein the output of the second DAC comprises a second voltage $V_2(t)$, and wherein the first drive signal corresponds to a first combined voltage of $V_1(t)+V_2(t)$ and the second drive signal corresponds to second combined voltage of $V_1(t)-V_2(t)$.

16. The system of claim 11, wherein the digital signal processor is configured to digitally combining the first encoded data with the second encoded data so as to create an input for a first DAC, and digitally combining the first encoded data with a differential of the second encoded data so as to create an input for a second DAC, and wherein the first drive signal is based on an output of the first DAC and the second drive signal is based on an output of the second DAC.

17. The system of claim 11, wherein the dual-drive modulator comprises a Mach-Zehnder modulator (MZM).

18. The system of claim 11, further comprising an optical receiver configured to receive the two-dimensional modulated optical output, wherein the optical receiver is further configured to transition from a first mode for receiving one-dimensional optical signals to a second mode for receiving two-dimensional optical signals.

19. The system of claim 18, wherein the optical receiver comprises two MZI switches configured to transmit a one-dimensional optical signal to a first set of photodetectors in the first mode and are configured to transmit a two-dimensional optical signal to a first and second set of photodetectors in the second mode.

20. The system of claim 11, further comprising an optical receiver configured to receive the two-dimensional modulated optical output, and wherein the two-dimensional modulated optical output is modulated in accordance with a pulse amplitude modulation and a differential m-level phase shift keying (PAM-DmPSK), and wherein the optical receiver is further configured to split the optical signal into a first optical signal for identifying the pulse amplitude modulation (PAM) and a second signal for identifying the differential m-level phase shift keying (DmPSK).

* * * * *